April 5, 1966     H. H. HILTON     3,244,946
ELECTROLYTIC CAPACITOR
Filed June 7, 1961
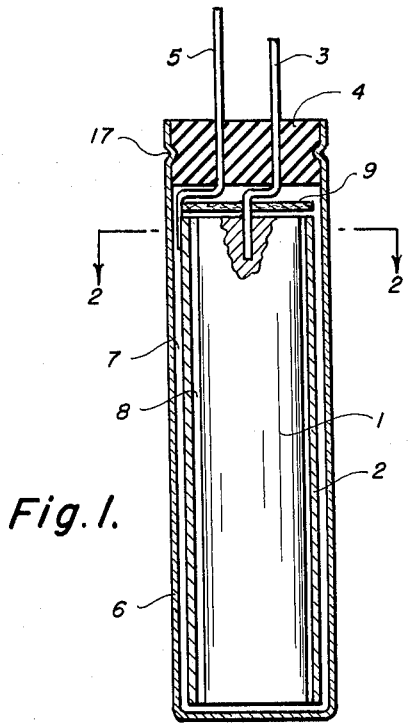
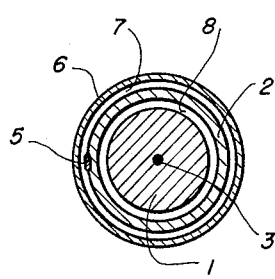
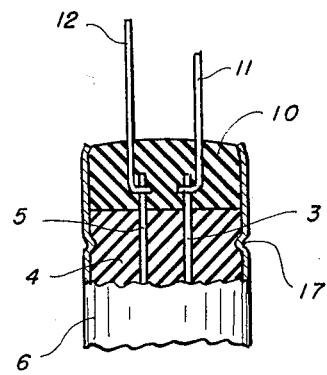
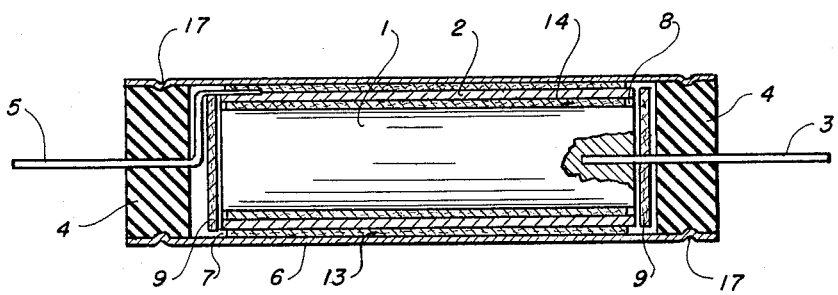
Inventor
Harry H. Hilton
by Rines and Rines
Attorneys

3,244,946
ELECTROLYTIC CAPACITOR

Harry H. Hilton, 20 Chester St., Glens Falls, N.Y.; Salvatore N. La Bruzzo, executor of said Harry H. Hilton, deceased
Filed June 7, 1961, Ser. No. 115,403
7 Claims. (Cl. 317—230)

The present invention relates to electrolytic capacitors. Though certain features of the invention are applicable also to polar capacitors, especially those of very low-voltage high-capacitance design, the invention is particularly related to capacitors of the non-polar type, especially adapted for use with alternating voltages.

An object of the invention is further to miniaturize present-day capacitors while maintaining or even increasing their efficiency and more particularly their voltage-microfarad rating.

Another object is to reduce the cost of manufacture of capacitors.

Other and further objects will be explained hereinafter and will be particularly pointed out in the appended claims.

With the above objects in view, a feature of the invention resides in providing the capacitor with a container in which are insulatingly disposed two cylindrical, substantially equal-mass very closely spaced suitably dimensioned electrodes one of which is hollow and the other of which is disposed in the hollow, the electrodes being separate from the container and being constituted of sintered tantalum or equivalent metal.

The invention will now be more fully explained in connection with the accompanying drawings, in which FIG. 1 is a longitudinal section illustrating a preferred embodiment of the invention;

FIG. 2 is a cross-section, taken upon the line 2—2 of FIG. 1;

FIG. 3 is a fragmentary longitudinal section similar to FIG. 1 of a modification; and FIG. 4 is a view similar to FIG. 1 of a further modification.

The electrolytic capacitor of the present invention comprises an inner cylindrical electrode 1, disposed in the hollow of an outer hollow cylindrical electrode 2. The word "cylindrical," as used herein, is used in a mathematical sense, not necessarily restricted to cross sections that are circular. The inner cylindrical electrode 1 is not necessarily solid, though shown so, and the two electrodes 1 and 2 are not necessarily, as shown, of substantially the same length.

The electrodes 1 and 2 are constituted of sintered pressed powder of tantalum or other refractory, corrosion-resistant, chemically inert metal capable of forming on its surface an anodic chemically and electrically stable oxide film. Among those metals, in addition to tantalum, are zirconium, titanium and niobium, as well as their alloys.

A lead wire conductor 3 is shown embedded in or welded to (FIG. 4) one end portion of the inner electrode 1, and a lead wire conductor 5 is shown welded to an end portion of the outer surface of the outer electrode 2. In FIG. 1, the lead wires 3 and 5 are shown connected to the same end portions of the respective electrodes 2 and 1, and, in FIG. 4, to the opposite end portions thereof. These lead wires 3 and 5 may be constituted of the same metal as the electrodes or any equivalent or other metal.

The lead wires 3 and 5 are shown in FIG. 1 extending through an insulating sealing plug 4 that closes the open end of a cup-shaped container 6 in which the electrodes are disposed. In FIG. 4, they are shown extending through respective insulating sealing plugs 4 that close the opposite ends of an open-ended container 6. The container 6 may be constituted of any desired material such as tantalum, aluminum, silver or even a non-metal such as a ceramic or a plastic. The plugs 4 may be constituted of any suitable sealing material, such as certain rubbers or certain synthetic plastics, among which may be mentioned polytetrafluoroethylene, marketed under the trademark Teflon, and polyfluorochlorethylene, marketed under the trademark Kel-P. The seals produced by the plugs 4 may be improved by crimping the end portion or portions of the container 6 against the insulating plug or plugs 4, as shown at 17.

Since polytetrafluoroethylene and polyfluorochloroethylene, however, are not very resilient, the seal or seals at the end or ends of the container 6 may be rendered tighter still by the use of a potting compound such as an epoxy resin, as shown at 10 in FIG. 3. The upper ends of the lead wires 3 and 5 are shown in FIG. 3 connected within the epoxy resin to lead wires 11 and 12, respectively.

The outer electrode 2 is shown spaced at 7 from the inner surface of the container 6. An insulating spacer, not shown in FIG. 1, but shown at 13 in FIG. 4, may be introduced into the space 7, in order to prevent contact of the outer electrode 2 with the inner wall of the container 6. The space 7 should be very small, in order to provide a close fit between the outer electrode 2 and the inner surface of the container 6.

The electrodes 1 and 2 are shown separated from each other by a space 8 of very small cross-dimension into which there may be inserted a further insulating spacer, not shown in FIG. 1, but shown in FIG. 4 at 14 for the purpose of preventing short-circuiting contact between the two electrodes 1 and 2.

Still another spacer 9, of circular-disc form, may be interposed between the ends of the electrodes 1 and 2 and the sealing plug or plugs 4. Since the lead wires 3 and 5 are shown extending therethrough, the spacers 9, in addition to their sealing function, perform the additional function also of assuring that the lead wire 5 of the outer electrode 2 shall not contact the inner electrode 1 or, in the case of FIG. 1, its lead wire 3.

The spacers 9, 13 and 14 may be constituted of cardboard, plastic or other suitable substance. By means of the various spacers 9, 13 and 14, the electrodes 1 and 2 are insulatingly disposed in the container 6. The spacers may be impregnated with a suitable electrolyte, which may be liquid or semi-solid, the latter, for example, like manganese dioxide. This is one method of providing the space 8 between the electrodes 1 and 2 with electrolyte but other methods of obtaining this result may also be employed.

It has heretofore been proposed to manufacture an outer tantalum electrode integrally with a tantalum container by first pressing a quantity of tantalum powder against the inside surface of the container and then heating the container and the powder as a unit. There are at least two objections to this proposal. In the first place, it is not easy to carry out this method commercially, and, secondly, the construction obtained thereby is not very well adapted to the carrying out of the present invention.

According to a feature of the present invention, therefore, not only the inner electrode 1, but also the outer electrode 2, may be manufactured entirely separate from the container 6, which effects the result of the electrodes 1 and 2 being both spaced from the walls of the container.

Since sintered electrodes like those described above are porous, they yield a far greater surface area than is provided by their external dimensions alone; and since the capacitance of a capacitor is a function of its surface area, a greater capacitance is therefore obtainable than with the aid of solid or leaf-foil electrodes. For nonpolar purposes, moreover, it is desirable that the effective surfaces of the two electrodes 1 and 2 be substantially equal. The electrodes 1 and 2 therefore, constitute a non-polar pair. This result may be theoretically obtained by making the electrodes 1 and 2 of substantially equal masses. It has been found, however, that the invention may be practiced if the masses are substantially the same within a range of about 50%.

The lengths of the cylinders of the electrodes 1 and 2 may vary substantially from about 1 to about 8 times its diameter and the thickness of the outer electrode 2 may vary substantially from about 0.1 to about 0.3 its outer diameter.

It has been found that a capacitor embodying the present invention, with electrodes 1 and 2 of 1/8 inch diameter and 5/8 inch long separated from each other by a space 8 substantially from about 0.002 to about .010 inch, has a volts-microfarads rating as high as is obtainable with tantalum-foil capacitors now on the market 9/32 inch diameter and 1 inch long. The present invention, therefore, results in a reduction in size of the capacitor and also in a corresponding reduction in cost.

Further modifications will occur to persons skilled in the art, and all such are considered to fall within the spirit and scope of the present invention, as defined in the appended claims.

What is claimed is:

1. An electrolytic capacitor comprising a container, two electrodes of sintered powder selected from the group consisting of tantalum, zirconium, titanium and niobium and their alloys of substantially the same masses within a range of about 50% disposed in the container, one of the electrodes being in the form of a hollow cylinder spaced from the container, a spacer disposed in the space between the inner surface of the container and the said one electrode, the other electrode being disposed in the hollow of and spaced from the cylinder, and an electrolyte in the container filling the space between the electrodes.

2. An electrolytic capacitor comprising a container, two electrodes of sintered tantalum powder of substantially the same masses within a range of about 50% disposed in the container, one of the electrodes being in the form of a hollow cylinder spaced from the container, a spacer disposed in the space between the inner surface of the container and the said one electrode, the other electrode being disposed in the hollow of and spaced from the cylinder, and an electrolyte in the container filling the space between the electrodes.

3. An electrolytic capacitor comprising a container, two electrodes of sintered tantalum powder of substantially the same masses within a range of about 50% disposed in the container, one of the electrodes being in the form of a hollow cylinder spaced from the container, a spacer disposed in the space between the inner surface of the container and the said one electrode, the other electrode being disposed in the hollow of the cylinder and spaced therefrom by a space substantially from about 0.002 to about 0.010 inch, and an electrolyte in the container filling the space between the electrodes.

4. An electrolytic capacitor comprising a container, two electrodes of sintered powder selected from the group consisting of tantalum, zirconium, titanium and niobium and their alloys of substantially the same masses within a range of about 50% disposed in the container, one of the electrodes being in the form of a hollow cylinder spaced from the container, a spacer disposed in the space between the inner surface of the container and the said one electrode, the other electrode being disposed in the hollow of the cylinder and spaced therefrom by a space substantially from about 0.002 to about 0.010 inch, and an electrolyte in the container filling the space between the electrodes.

5. An electrolytic capacitor comprising a container, two electrodes of sintered powder substantially 1/8 inch diameter and 5/8 inch long selected from the group consisting of tantalum, zirconium, titanium and niobium and their alloys of substantially the same masses within a range of about 50% disposed in the container, one of the electrodes being in the form of a hollow cylinder substantially 1 to 8 of its own diameters long and spaced from the container, and of a wall thickness substantially from about 0.1 to about 0.3 times its outer diameter, a spacer disposed in the space between the inner surface of the container and the said one electrode, the other electrode being disposed in the hollow of the cylinder and spaced therefrom substantially from about 0.002 to about 0.010 inch, and an electrolyte in the container filling the space between the electrodes.

6. An electrolytic capacitor comprising a container, a non-polar pair of electrodes of sintered powder selected from the group consisting of tantalum, zirconium, titanium and niobium and their alloys disposed in the container, one of the electrodes being in the form of a hollow cylinder spaced from the container, a spacer disposed in the space between the inner surface of the container and the said one electrode, the other electrode being disposed in the hollow of and spaced from the cylinder, and an electrolyte in the container filling the space between the electrodes.

7. An electrolytic capacitor comprising a container, a non-polar pair of electrodes disposed in the container, one of the electrodes being in the form of a hollow cylinder spaced from the container, a spacer disposed in the space between the inner surface of the container and the said one electrode, the other electrode being disposed in the hollow of and spaced from the cylinder, and an electrolyte in the container filling the space between the electrodes.

References Cited by the Examiner

UNITED STATES PATENTS

| | | | |
|---|---|---|---|
| 867,579 | 10/1907 | Gerard | 317—230 |
| 1,770,465 | 7/1930 | Edelman | 317—230 |
| 2,368,688 | 2/1945 | Taylor | 317—230 |
| 2,809,331 | 10/1957 | Canty et al. | 317—230 |
| 2,851,642 | 9/1958 | Schaeren | 317—230 |
| 2,910,633 | 10/1959 | Hovey | 317—230 |
| 3,046,457 | 7/1962 | Scholte | 317—230 |
| 3,115,596 | 12/1963 | Fritsch | 317—230 |

JOHN W. HUCKERT, *Primary Examiner.*

GEORGE N. WESTBY, *Examiner.*

L. ZALMAN, J. D. KALLAM, *Assistant Examiners.*